(12) United States Patent
Ise et al.

(10) Patent No.: US 7,199,788 B2
(45) Date of Patent: Apr. 3, 2007

(54) POINTING INPUT DEVICE

(75) Inventors: Yuichi Ise, Tokyo (JP); Masahiko Toyoda, Tokyo (JP)

(73) Assignee: SMK Corporation, Tokyo (JP)

( * ) Notice: Subject to any disclaimer, the term of this patent is extended or adjusted under 35 U.S.C. 154(b) by 437 days.

(21) Appl. No.: 10/622,268

(22) Filed: Jul. 17, 2003

(65) Prior Publication Data

US 2004/0066379 A1    Apr. 8, 2004

(30) Foreign Application Priority Data

Oct. 4, 2002    (JP)    ............................. 2002-292207

(51) Int. Cl.
    *G09G 5/00* (2006.01)
(52) U.S. Cl. .................. 345/173; 345/168; 345/169; 345/176; 345/177
(58) Field of Classification Search ........ 345/156–179; 178/18.01–18.05; 700/100; 340/172; 310/324; 335/222; 359/642
    See application file for complete search history.

(56) References Cited

U.S. PATENT DOCUMENTS

| | | | | |
|---|---|---|---|---|
| 4,698,460 A | * | 10/1987 | Krein et al. ................. | 345/173 |
| 4,698,461 A | * | 10/1987 | Meadows et al. ........... | 345/174 |
| 4,707,845 A | * | 11/1987 | Krein et al. .............. | 178/20.01 |
| 5,117,146 A | * | 5/1992 | Martin et al. ........... | 310/313 R |
| 5,231,381 A | | 7/1993 | Duwaer | |
| 5,305,017 A | * | 4/1994 | Gerpheide .................. | 345/174 |
| 5,355,149 A | | 10/1994 | Casebolt | |
| 5,573,077 A | * | 11/1996 | Knowles .................. | 178/18.04 |
| 5,591,945 A | * | 1/1997 | Kent ........................ | 178/18.04 |
| 5,861,875 A | * | 1/1999 | Gerpheide .................. | 345/174 |
| 5,897,648 A | | 4/1999 | Henderson | |
| 6,091,406 A | * | 7/2000 | Kambara et al. ........... | 345/177 |
| 6,104,374 A | * | 8/2000 | Sullivan et al. ............. | 345/694 |
| 6,111,565 A | | 8/2000 | Chery et al. | |
| 6,124,845 A | * | 9/2000 | Toda et al. .................. | 345/157 |
| 6,492,979 B1 | * | 12/2002 | Kent et al. ................... | 345/173 |
| 6,504,530 B1 | * | 1/2003 | Wilson et al. .............. | 345/173 |
| 6,731,270 B2 | * | 5/2004 | Tosaya ........................ | 345/173 |

(Continued)

FOREIGN PATENT DOCUMENTS

EP    0 316 972 A2    5/1989

(Continued)

OTHER PUBLICATIONS

"Reach Out and Touch the Process" by Jane Stoffel Gerold in Control Engineering, vol. 39, No. 1, Jan. 1992, pp. 74-76.

(Continued)

*Primary Examiner*—Bipin Shalwala
*Assistant Examiner*—Prabodh Dharia
(74) *Attorney, Agent, or Firm*—Darby & Darby

(57) ABSTRACT

The present invention provides a pointing input device, which sequentially outputs pointing position data indicating a pointing input position and push detection data from a push by the same pen or finger used for a pointing input. The pointing input device includes a display panel for displaying any pointing input information and an optical touch panel. The optical touch panel detects the pointing input in an input operation area, through which a display area is visible, and outputs the pointing position data. Piezoelectric substrates are attached to a transparent protective plate protecting the top surface of the display panel. When an operator pushes the transparent protective plate disposed at the lower part of the optical touch panel while carrying out the pointing input, the piezoelectric substrates output electric signals by which the push is judged. Then, the push detection data is outputted with the pointing position data.

7 Claims, 3 Drawing Sheets

U.S. PATENT DOCUMENTS

| | | | |
|---|---|---|---|
| 6,784,871 B2 * | 8/2004 | Toda .......................... | 345/156 |
| 2003/0067449 A1 * | 4/2003 | Yoshikawa et al. ......... | 345/173 |
| 2004/0128012 A1 * | 7/2004 | Lin ............................. | 700/100 |
| 2004/0174092 A1 * | 9/2004 | Iwata ......................... | 310/324 |
| 2004/0263484 A1 * | 12/2004 | Mantysalo et al. ......... | 345/173 |

FOREIGN PATENT DOCUMENTS

| | | |
|---|---|---|
| EP | 0 372 964 A2 | 6/1990 |
| EP | 0372964 A2 | 6/1990 |
| EP | 1 059 604 A A2 | 12/2002 |
| GB | 2 263 765 A | 8/1993 |
| JP | 11-086698 * | 3/1999 |
| WO | WO 02/35460 A1 | 5/2002 |
| WO | WO-02/35460 A1 | 5/2002 |

OTHER PUBLICATIONS

"Touch Technology Reaches Out To The 'All But Untrainable'" by Luciano V P in Computer Technology Review, vol. 9, No. 14, Nov. 1, 1989, pp. 90-93.

"Finger Statt Maus Touchscreen-Techniken Im Vergleich" by Kuhlmann U, CT Magazine Fuer Computer Technik, Verlag Heinz Heise GMBH, Hannover, DE, No. 15, Jul. 17, 2000, pp. 116-118.

European Search Report for EP 03 02 1149 dated Dec. 17, 2004.

European Examination Report, date Apr. 18, 2006.

* cited by examiner

POINTING INPUT DEVICE

BACKGROUND OF THE INVENTION

1. Field of the Invention

The present invention relates to a pointing input device in which an operator carries out a pointing input while looking at pointing input information displayed on a display panel. More particularly, the present invention relates to a pointing input device for detecting a pointing input position by means of an optical touch panel, and for carrying out a predetermined command corresponding to the pointing input information when the operator pushes a position where the pointing input information is displayed.

2. Description of the Related Art

A pointing input device is generally known in which an optical touch panel is laminated on a display panel composed of a CRT (cathode-ray tube) or an LCD (liquid crystal display). The display panel displays various kinds of pointing input information, so that an operator points and inputs the position of the desired pointing input information in an input operation area of the optical touch panel by looking at the pointing input information.

The structure of a conventional pointing input device 100 will be hereinafter described with reference to FIGS. 4 and 5. The pointing input device 100 has a case 101, a liquid crystal display panel 102, a transparent glass substrate 103 for protecting a surface of the liquid crystal display panel 102, and an optical touch panel 104 which are each laminated from underneath in the order described above.

A liquid crystal driver (not shown) displays a plurality of kinds of pointing input information 105 on a display area of the liquid crystal display panel 102 in accordance with the application of pointing input. An operator carries out the pointing input as described later, with reference to the pointing input information 105.

The optical touch panel 104 has light-emitting devices 108 arranged along the orthogonal X and Y directions of a rectangular frame 107 at equal intervals, and photoreceptor devices 109 arranged opposite to the light-emitting devices 108 and across the input operation area 107A of the rectangular frame 107. The light-emitting devices 108 sequentially emit light for scanning, and the photoreceptor devices 109 receive the light.

When the operator puts a pen or a finger on any pointing input position inside the input operation area 107A, light beams passing through the pointing input position are intercepted. The photoreceptor devices 109 in the light paths of the light beams do not receive the light with proper timing to the light emission of the corresponding light-emitting devices 108. Thus, it is possible to detect the pointing input to the optical touch panel 104 and X and Y coordinates of the pointing input position.

Since the input operation area 107A enclosed within the rectangular frame 107 is disposed over the display area of the liquid crystal display panel 102, it is possible for the operator to carry out the pointing input, while looking at the pointing input information 105 displayed on the liquid crystal display panel 102 from above through the transparent glass substrate 103.

When the pointing input device 100 detects that the operator retracts the pen or the finger from the pointing input position of the input operation area 107A after detecting the pointing input, the pointing input device 100 outputs push detection data for carrying out a command in accordance with the pointing input position.

On the other hand, several kinds of pointing input information 105 are provided with pointing input areas 106 (shown in broken lines in the drawing) which are located above the pointing input information 105 in the input operation area 107A. The pointing input area 106 corresponds to a predetermined command indicated by the pointing input information 105. When the pen or finger points to the inside of the pointing input area 106, and the push detection data is outputted, the predetermined command corresponding to the pointing input area 106 is carried out.

Accordingly, when the operator points to the display position of the predetermined pointing input information 105, namely points to the inside of the pointing input area 106, and then when the operator retracts the pen or the finger from the pointing input position of the input operation area 107A, the predetermined command corresponding to the pointing input information 105 is carried out.

When the conventional pointing input device 100 detects the pointing input to the input operation area 107A and the position thereof, and also when the operator releases the pointing input by retracting the pen or finger, the push detection data for carrying out the predetermined command is outputted. Therefore, the operator can change the pointing input position and enter the command corresponding to the specific pointing input position, while looking at the pointing input information 105.

The push detection data is outputted every time the pointing input is released, in addition to when the pointing input is carried out by the operator inserting the pen or the finger into the pointing input area 106. Accordingly, there is a problem that the predetermined command can be carried out by mistake, such as when the operator retracts the pen or the finger from the pointing input area 106 for the purpose of simply finishing an operation.

Thus, when releasing the pointing input by retracting the pen or the finger, the operator needs to pay attention to a release position. Also, the operator cannot suspend an operation to think, and the operator cannot rest before completing the operation.

It is possible to attach another push detection switch mechanism for the purpose of outputting the push detection data. In this case, however, there are other problems that the size of the device becomes large, and the operator has to operate with both hands because the push detection switch mechanism cannot be operated with the same finger or the pen for the pointing input.

Furthermore, the pointing input device 100 always detects the pointing input even when the light beam is only momentarily intercepted. Thus, there is a problem that a water droplet, a bug, or the like passing through the input operation area 107A causes the pointing input device 100 to malfunction.

SUMMARY OF THE INVENTION

In view of the above problems, an object of the present invention is to provide a pointing input device which sequentially outputs pointing position data indicating a pointing input position, and outputs push detection data in response to a pushing operation by using the same pen or finger for pointing input.

Another object of the present invention is to provide a pointing input device in which a malfunction does not occur when a water droplet or a bug lands on an optical touch panel which is used for the detection of pointing input.

To achieve the above objects, a pointing input device according to an aspect of the present invention includes: a display panel for displaying any pointing input information on a display area thereof; a transparent protective plate laminated on the display area of the display panel; a piezoelectric substrate attached to the transparent protective plate, for converting deformation caused by a push against the transparent protective plate into an electric signal and outputting the electric signal; and an optical touch panel disposed on the transparent protective plate, for emitting light beams for reticulately scanning an input operation area of the optical touch panel along orthogonal X and Y directions to detect a pointing input and a pointing input position in the input operation area when the light beams are intercepted by the pointing input, a display area of the input operation area being visible through the transparent protective plate. The pointing input device outputs pointing position data indicating the pointing input position, while the optical touch panel detects the pointing input. The pointing input device outputs push detection data together with the pointing position data, when the electric signal is outputted from the piezoelectric substrate and the push against the transparent protective plate is judged, while the optical touch panel is detecting the pointing input.

The display area of the display panel is visible from the input operation area of the optical touch panel, so that an operator can carry out the pointing input by inserting a finger or the like in the input operation area, while looking at the pointing input information. The optical touch panel sequentially outputs the pointing position data indicating the detected pointing input position during the detection of the pointing input. Therefore, it is possible for the pointing input device to carry out a predetermined operation and to control the display in accordance with the pointing input position.

When the transparent protective plate is pushed, the piezoelectric substrate outputs electric signals in response to the deformation of the transparent protective plate, and the push detection data is outputted. Therefore, it is possible to carry out the predetermined command at any pointing input position without releasing the pointing input.

The push is detected by the piezoelectric substrate attached to the transparent protective plate, which protects the surface of the display panel against external force. Therefore, the pointing input device needs just a small space for attaching the piezoelectric substrate to detect the push, so that the whole pointing input device does not become large.

Since the transparent protective plate is disposed under the input operation area, it is possible to push the transparent protective plate with the same finger or the like for the pointing input. Namely, the pointing input and the push operation can be continuously carried out.

A pointing input device according to another aspect of the invention includes: a display panel for displaying any pointing input information on a display area thereof; a transparent protective plate laminated on the display area of the display panel; a piezoelectric substrate attached to the transparent protective plate, for converting deformation caused by a push against the transparent protective plate into an electric signal and outputting the electric signal; and an optical touch panel disposed on the transparent protective plate, for emitting light beams for reticulately scanning an input operation area of the optical touch panel along orthogonal X and Y directions to detect a pointing input and a pointing input position in the input operation area when the light beams are intercepted by the pointing input, a display area of the input operation area being visible through the transparent protective plate. The pointing input device outputs pointing position data detected by the optical touch panel when it is judged that the electric signal is outputted from the piezoelectric substrate and the transparent protective plate is pushed while the optical touch panel is detecting the pointing input.

The display area of the display panel is visible from the input operation area of the optical touch panel, so that an operator can carry out the pointing input by inserting a finger or the like in the input operation area, while looking at the pointing input information.

The optical touch panel detects the pointing input position while detecting the pointing input, but the pointing input data indicating the pointing input position is outputted only when it is judged that the transparent protective plate is pushed. Therefore, if a bug, a water droplet or the like temporarily intercepts the light beams within the input operation area, the pointing position data is not outputted, so that malfunction does not occur.

The push against the transparent protective plate is detected by the piezoelectric substrate attached to the transparent protective plate, which protects the surface of the display panel against external force. Therefore, the pointing input device needs just a small space for attaching the piezoelectric substrate to detect the push, so that the whole pointing input device does not become large.

A pointing input device according to another aspect of the invention has a pair of piezoelectric substrates of narrow and elongated shape. The piezoelectric substrates are attached to the transparent protective plate and are orthogonal to each other.

Because the pair of piezoelectric substrates is attached orthogonally to each other, either of the piezoelectric substrates can detect the deformation of the transparent protective plate, even if the transparent protective plate deforms in any direction by the push. Therefore, it is possible to certainly detect the push.

DETAILED DESCRIPTION OF THE PREFERRED EMBODIMENTS

Figure 1:
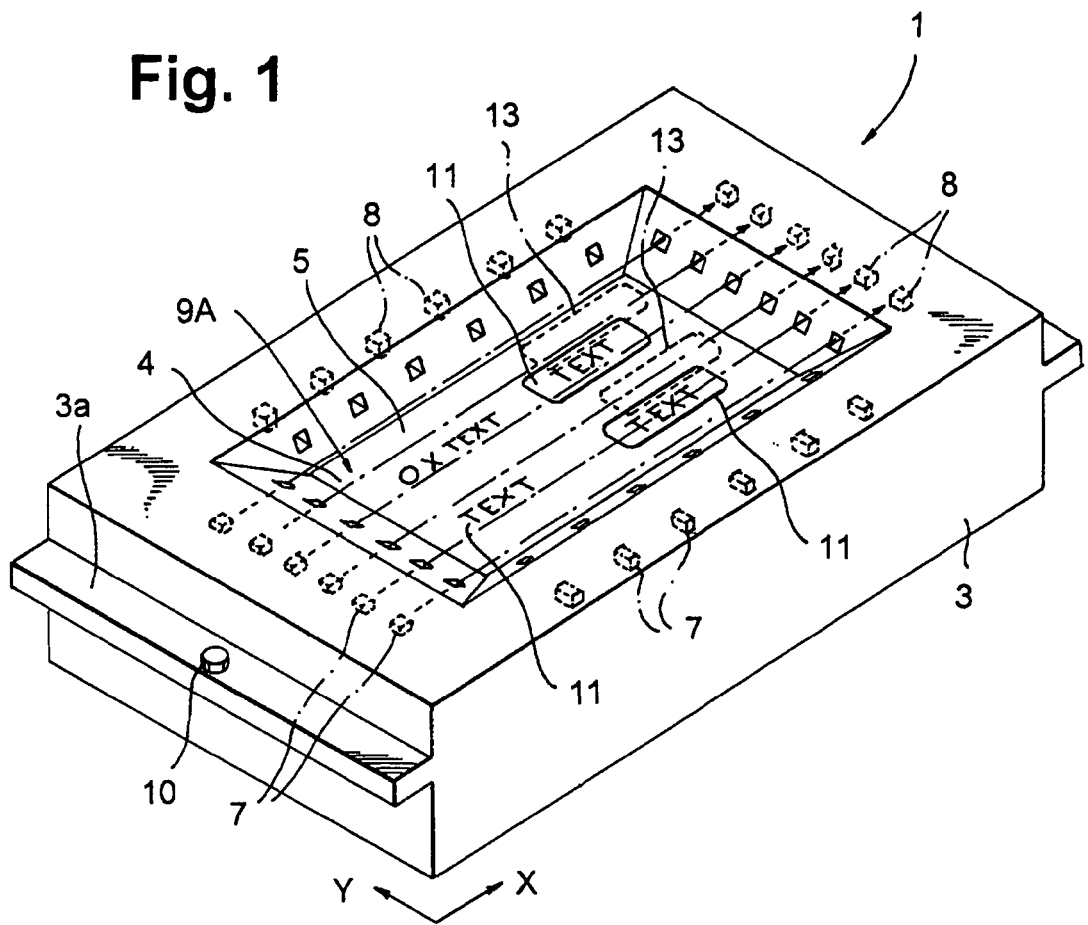
FIG. 1 is a perspective view of a pointing input device 1 according to an embodiment of the present invention.

An embodiment of a pointing input device 1 according to the present invention will be hereinafter described with reference to FIGS. 1 to 3. The pointing input device 1 according to this embodiment is used as an input device for an ATM (automatic teller machine) installed in a bank, and the whole pointing input device 1 is installed so as to be flush with the surface of the ATM.

The pointing input device 1 has a plastic case 3 which contains a liquid crystal display panel 4, a transparent protective plate 5 for covering the surface of the liquid crystal display panel 4, a pair of piezoelectric substrates 6A and 6B attached along the two edges, which are perpendicular to each other, of the transparent protective plate 5, and an optical touch panel 9 provided with plural pairs of light-emitting devices 7 and photoreceptor devices 8.

The case 3, in the shape of a rectangular parallelepiped, is installed so as to be flush with the surface of the main body 2 of the ATM, as an operation surface. The case 3 is, as shown in FIG. 2, secured with screws 10 which penetrate flanges 3a from the inside of the main body 2.

A rectangular shaped opening formed in the top plate of the case 3 serves as the input operation area 9A of the optical touch panel 9. The liquid crystal display panel 4 and the transparent protective plate 5 are so contained inside the case 3 that the display area of the liquid crystal display panel 4 can be seen from the input operation area 9A through the transparent protective plate 5.

Figure 3:
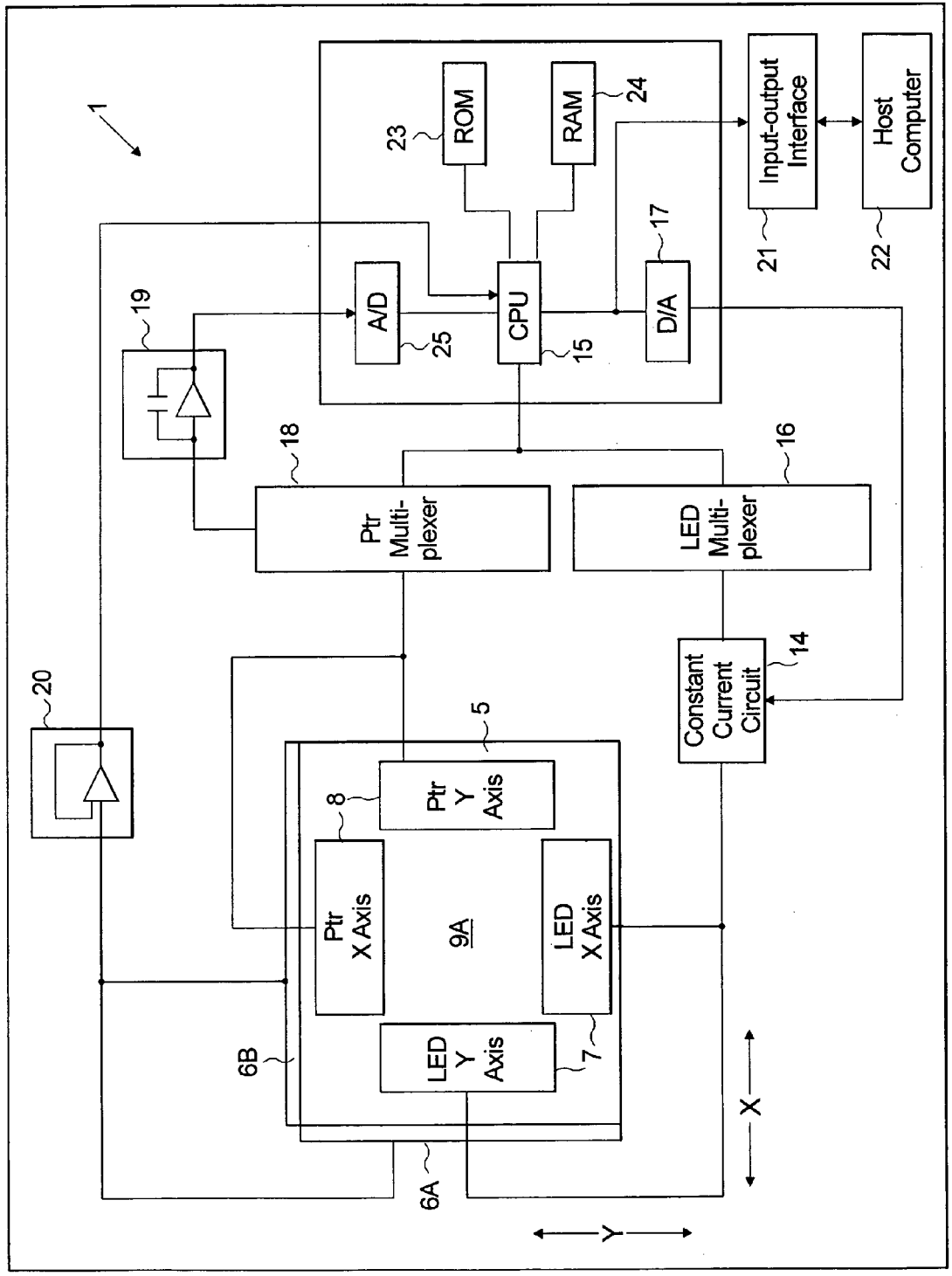
FIG. 3 is a block diagram showing circuitry configuration of the pointing input device of FIG. 1.
Figure 4:
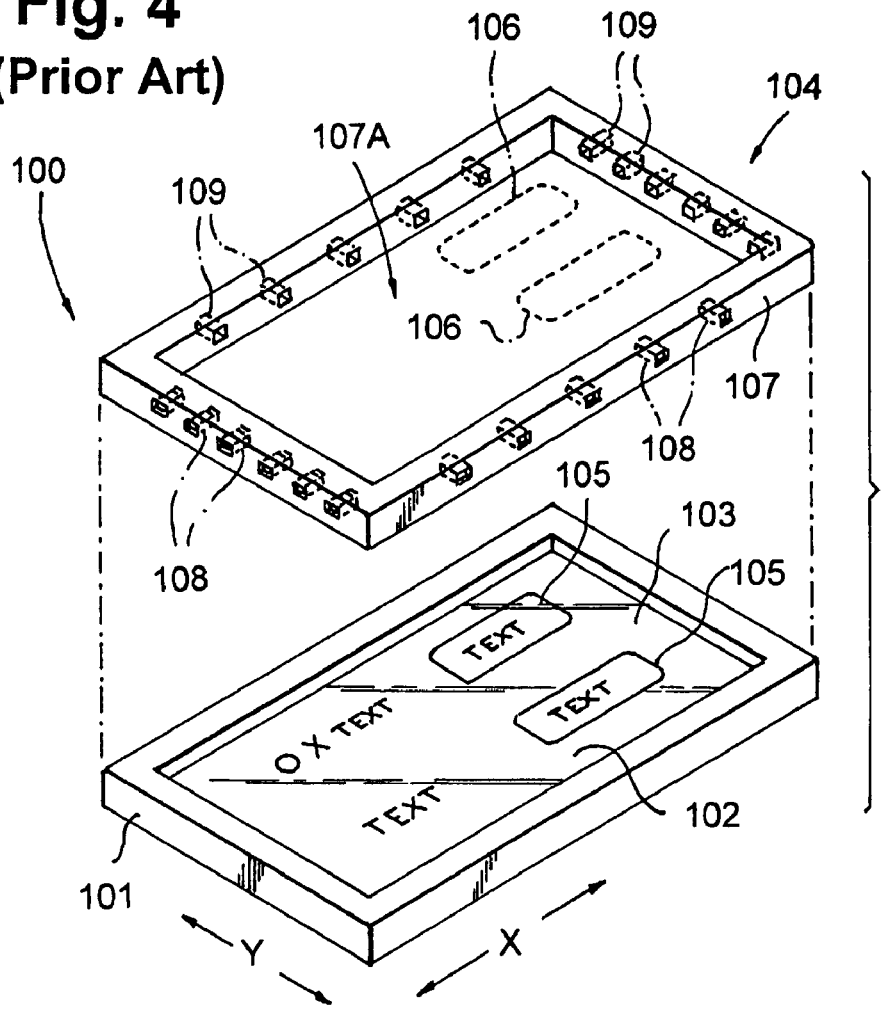
FIG. 4 is an exploded perspective view of a conventional pointing input device 100.
Figure 5:
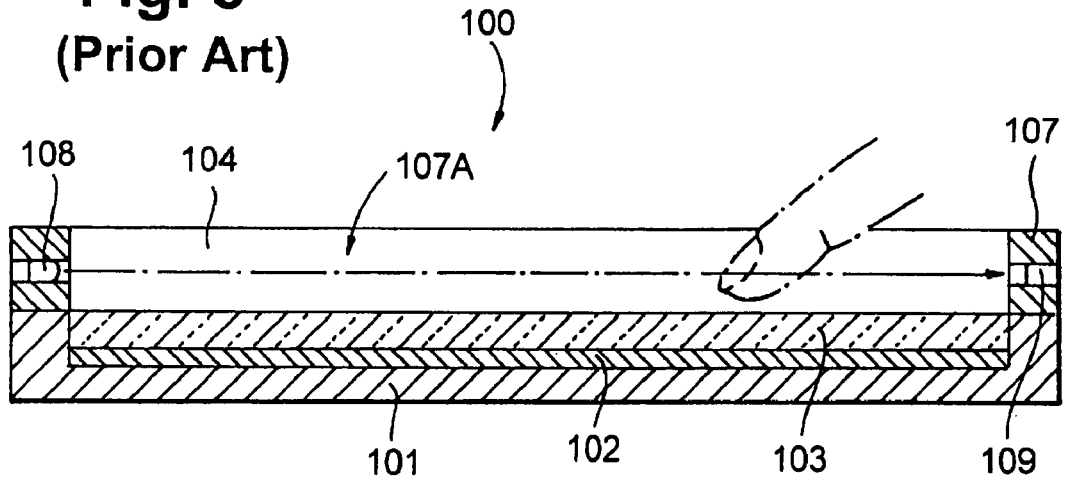
FIG. 5 is a longitudinal sectional view of the pointing input device of FIG. 4.

The liquid crystal display panel 4, the piezoelectric substrates 6A and 6B, and the optical touch panel 9 are connected to each circuit component shown in FIG. 3 with cables (not illustrated) drawn out of the case 3.

The liquid crystal display panel 4 displays any pointing input information 11 for carrying out pointing input at any position of the display area, in response to control from a liquid crystal driver (not illustrated).

Figure 2:
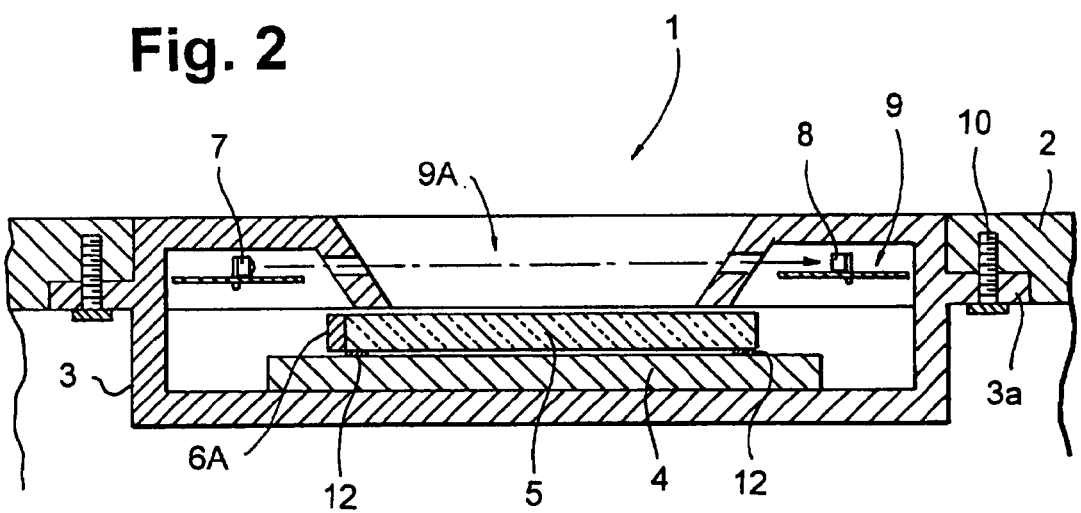
FIG. 2 is a longitudinal sectional view of the pointing input device of FIG. 1.

Because the pointing input device 1 is used in the ATM of the bank, as shown in FIG. 1, the pointing input information 11 about how to operate, about a deposit and withdrawal, and the like is displayed as an initial screen. The pointing input information 11 is displayed as a message to the operator in the form of text, numbers, or the like.

A backlight panel (not illustrated) is disposed between the rear surface of the liquid crystal display panel 4 and the case 3. A reflective film is glued on the rear surface of the backlight panel. The backlight panel disperses light from a backlight source and illuminates the liquid crystal display panel 4 from its backside, for the purpose of making it easy for an operator to look at the pointing input information 11.

The transparent protective panel 5 is laminated on the surface of the liquid crystal display panel 4 via a pressure-sensitive adhesive sheet 12 so as to cover the surface of the liquid crystal display panel 4. Being attached to the surface of the liquid crystal display panel 4 with the pressure-sensitive adhesive sheet 12, the transparent protective plate 5 freely deforms without any constraint, so that it is possible to detect a push in response to the deformation of the transparent protective plate 5, as described later.

Each of the piezoelectric substrates 6A and 6B is a single-layer substrate made of piezoelectric material such as piezoelectric ceramic which is typified by piezoelectric single crystal and PZT (lead zirconate titanate), polyvinylidene fluoride (PVDF), and the like. The piezoelectric substrates 6A and 6B of this embodiment are composed of piezoelectric ceramic plates made of the piezoelectric ceramic material of a PZT series, which has mechanical durability and is most widely used. The piezoelectric substrates 6A and 6B are formed in the shape of elongated and thin plates along the edges of the transparent protective plate 5 along X and Y directions, orthogonal to each other.

Since each of the piezoelectric substrates 6A and 6B is the thin plate with a single-layer, and the height thereof is approximately 200 μm even when the height of a leading electrode secured on the surface thereof is included. Because the piezoelectric substrates 6A and 6B are not bulky, it is possible to attach the piezoelectric substrates 6A and 6B to any of the positions of the ordinary transparent protective plate 5 without considering space for installation.

This invention takes advantage of the piezoelectric effect of the piezoelectric substrates 6A and 6B (i.e., takes advantage of voltage signals generated by mechanical deformation). In order to transmit the deformation generated in the transparent protective plate 5 to the piezoelectric substrates 6A and 6B, the piezoelectric substrates 6A and 6B are attached to the transparent protective plate 5 along the edges thereof by applying various kinds of adhesives like an epoxy adhesive, an acrylic adhesive, and the like.

Accordingly, when the transparent protective plate 5 is pushed, the deformation is transmitted to the piezoelectric substrates 6A and 6B, and voltage is outputted in response to the deformation of the piezoelectric substrates 6A and 6B.

The piezoelectric substrates 6A and 6B do not cover the display area because they are attached to the edges of the transparent protective plate 5. Also, the piezoelectric substrates 6A and 6B cannot be seen from the outside, because they are contained in the case 3 enclosing the input operation area 9A. However, the piezoelectric substrates 6A and 6B can be attached anywhere, as long as the piezoelectric substrates 6A and 6B can detect the deformation of the transparent protective plate 5.

The optical touch panel 9 is provided with a number of light-emitting devices 7 and photoreceptor devices 8 arranged along the periphery of the opening of the case 3 (the input operation area 9A), for the purpose of detecting the pointing input with a finger, a pen or the like, and the pointing input position.

Referring to FIG. 1, the light-emitting devices 7 are arranged at equal intervals along the orthogonal X and Y directions of the periphery of the input operation area 9A and are positioned facing inward toward the center of the input operation area 9A. The photoreceptor devices 8, in pairs with the light-emitting devices 7, are arranged inside the case 3 opposite to the corresponding light-emitting devices 7 across the input operation area 9A.

When the light-emitting devices 7 arranged in this manner sequentially emit light for scanning, reticulate scanning light paths, as shown in dashed lines in FIG. 1, are formed in the input operation area 9A. When the operator puts the pen or the finger in the input operation area 9A for the pointing input, the pen or the finger intercepts light beams which pass through the pointing input position in the X and Y directions.

Accordingly, the photoreceptor devices 8 placed in the light paths do not receive the light beams from the corresponding light-emitting devices 7 with proper timing to the light emission of the light-emitting devices 7. Therefore, it is possible to detect the pointing input by the operator and X and Y coordinates which indicate the pointing input position.

If necessary, pointing input areas 13 (shown in broken lines in FIG. 1) are virtually provided in the input operation area 9A. Each of the pointing input areas 13 corresponds to the predetermined command for the ATM. The pointing input areas 13 are provided in the input operation area 9A, above the display positions of the pointing input information 11. The pointing input area 13 is divided off from a surrounding area with a rectangular outline indicated by X and Y coordinates.

Therefore, the operator can carry out the pointing input to the pointing input area 13 corresponding to the pointing input information 11 by means of inserting the finger or the pen in the input operation area 9A, and by looking at the pointing input information 11 displayed on the liquid crystal display panel 4 from above through the transparent protective plate 5.

FIG. 3 is a block diagram of circuit components provided in the pointing input device 1 for the purpose of judging the push as described above, and detecting the pointing input and the pointing input position. The operation of the pointing input device 1 will be hereinafter described with reference to FIG. 3.

The plural light-emitting devices 7 (corresponding to LED X Axis and LED Y Axis shown in FIG. 3), which are arranged along the X and Y directions of the input operation area 9A, are connected to a constant current circuit 14. Each of the light-emitting devices 7 is composed of an LED which emits a light beam in response to a flow of constant current. Each light-emitting device 7 is connected to an LED multiplexer 16 via the constant current circuit 14. A CPU 15 controls the connection between each light-emitting device 7 and the LED multiplexer 16. The constant current circuit 14 is connected to the CPU 15 via a digital-to-analog converter 17. Thus, the CPU 15 applies driving current to each light-emitting device 7 with predetermined scanning timing in order of arrangement position, for the purpose of emitting the light beam.

On the other hand, plural photoreceptor devices 8, arranged opposite to each of the plural light-emitting devices 7 across the input operation area 9A, are composed of phototransistors which receive the light beam and output light-reception signals. Each of the photoreceptor devices 8 is connected to a Ptr multiplexer 18 by which the CPU 15 controls a connection between the individual photoreceptor device 8 and an integrator circuit 19. The CPU 15 connects the photoreceptor device 8, opposite to the light-emitting device 7 to which the driving current is applied so as to be controlled, to the integrator circuit 19, in synchronization with the light emission control. The output from the integrator circuit 19 is inputted to the CPU 15 via an analog-to-digital converter 25, so that the CPU 15 can obtain the integrated light-reception signals from the integrator circuit 19 with the scanning timing of each light-emitting device 7, unless the light beam is intercepted within the input operation area 9A, in other words, there is the pointing input.

If there is the pointing input in the input operation area 9A, the light beams passing through the pointing input position are intercepted in the X and Y directions. Thus, the CPU 15 detects the pointing input by the operator and the X and Y coordinates indicating the pointing input position, by means of stopping the light-reception signals to be inputted and its timing.

Each of the piezoelectric substrates 6A and 6B attached to the edges of the transparent protective plate 5 is connected to the input of the CPU 15 via an amplifier circuit 20. Upon pushing the transparent protective plate 5, the deformation is transmitted to the piezoelectric substrates 6A and 6B. The voltage signals generated in response to the deformation of the piezoelectric substrates 6A and 6B is amplified by the amplifier circuit 20 and then inputted to the CPU 15.

When the voltage of the voltage signals inputted from the amplifier circuit 20 becomes larger than or equal to a predetermined threshold voltage, the CPU 15 judges the push to the transparent protective plate 5. The threshold voltage is set at a voltage level which is equal to a voltage outputted from the amplifier circuit 20 when the operator consciously pushes the transparent protective plate 5 with a force that is greater than a predetermined pushing force, so that the CPU 15 does not judge the push if the operator unconsciously touches the transparent protective plate 5.

The piezoelectric substrates 6A and 6B are attached to the edges of the transparent protective plate 5 along the X and Y directions, which are orthogonal to each other. Accordingly, if the operator pushes any position in the transparent protective plate 5, the deformation is transmitted to any of the piezoelectric substrates 6A and 6B and the push is judged.

The output of the CPU 15 is connected to a host computer 22 via an input-output interface 21. The CPU 15 outputs pointing position data indicating the pointing input position via the input-output interface 21 while detecting the pointing input. In a case where the push is judged, the CPU 15 outputs push detection data together with the pointing position data.

A ROM 23 and a RAM 24 connected to the CPU 15 are memory devices for storing a program to carry out the above operation of the CPU 15, for storing the threshold voltage for judging the push and the like, and for temporarily storing inputted data.

The host computer 22 outputs predetermined display control signals to the liquid crystal driver (not illustrated) in order to control the display of the liquid crystal display panel 4 and makes the ATM carry out the predetermined commands.

In this embodiment, when the pointing position data indicating the pointing input position is inputted to the host computer 22, a cursor appears in the display area corresponding to the pointing input position of the liquid crystal display panel 4, in order to inform the operator of the detection of the pointing input and the pointing input position.

The host computer 22 constantly judges whether or not the pointing input position indicated by the pointing position data is within any of the pointing input areas 13, as long as the pointing position data is inputted. When the pointing input position is within the specific pointing input area 13, and also the push detection data is inputted, the host computer 22 makes the ATM carry out the predetermined command corresponding to the pointing input area 13.

When the operator points to the pointing input information 11 indicating "deposit" and pushes against the transparent protective plate 4 at a position above its display area, for example, the pointing position data which indicates that the position is within the pointing input area 13 set above the pointing input information 11, the push detection data is outputted to the host computer 22. The host computer 22 makes the ATM carry out an operation for the "deposit," such as displaying the pointing input information 11 for inputting an amount of money deposited on the liquid crystal display panel 4, controlling an opening of a shutter for depositing bills, and the like.

The host computer 22 carrying out the above operation may be disposed inside the pointing input device 1. The CPU 15 may carry out the operation as the host computer 22.

In the above embodiment, when the push is judged, the pointing position data and the push detection data are outputted and the predetermined command is carried out. However, the CPU 15 may not output the pointing position data constantly even if the push is detected, but the pointing position data may be outputted when the push is judged.

According to the pointing input device of the present invention, even if a bug, a water droplet, or the like, which passes through the input operation area 9A, temporarily intercepts the light beams, the pointing position data indicating the intercepted position is not outputted by mistake. Therefore, it is possible for the operator to certainly carry out the pointing input with the intentional pushing operation.

The display panel is the liquid crystal display panel 4 in this embodiment. However, the display panel may be a CRT, a plasma display panel, or the like, as long as the display panel can display various kinds of pointing input information at any position on a plane.

One pair of the piezoelectric substrates are attached to the transparent protective plate 5 in this embodiment, but one piezoelectric substrate or three or more divided piezoelectric substrates may be used, as long as the piezoelectric substrate(s) can detect the deformation by the push.

If the integrator circuit is provided between the outputs of the piezoelectric substrates and the CPU 15, electric signals indicating the amplitude of the deformation in accordance with the strength of the push are inputted to the CPU 15. Thus, the CPU 15 can output the strength data of the push against the transparent protective plate 5.

As described above, according to an aspect of the present invention, when the operator pushes the transparent protective plate while carrying out the pointing input to the optical touch panel, both the pointing position data indicating the pointing input position and the push detection data representing the push against the transparent protective plate are outputted together. Thus, the operator can output data corresponding to the pushing operation while moving a mouse.

The push can be detected by the pointing input device with simple structure in which the piezoelectric substrates are only attached to the transparent protective plate, which protects the display area of the display panel. Therefore, there are advantages that the pointing input device does not become large, and existing parts can be used therein.

According to another aspect of the invention, only when the transparent protective plate is pushed, the pointing input data is outputted. Thus, even if a water droplet, a bug or the like temporarily intercepts the light beams in the input operation area, the pointing position data does not outputted, so that it is possible to prevent a malfunction of the pointing input device.

The push can be detected by the pointing input device with the simple structure in which the piezoelectric substrates are only attached to the transparent protective plate, which protects the display area of the display panel. Therefore, it is possible to use the structure of the conventional pointing input device as-is.

Furthermore, according to another aspect of the invention, one pair of the piezoelectric substrates is attached to the transparent protective plate and the piezoelectric substrates are orthogonal to each other. Thus, if the transparent protective plate deforms in any direction in response to the push, the deformation is transmitted to any of the piezoelectric substrates, so that the push is certainly detected.

What is claimed is:

1. A pointing input device comprising:
  a display panel operable to display any pointing input information on a display area;
  a transparent protective plate laminated on the display area of the display panel;
  a piezoelectric substrate attached to the transparent protective plate operable to convert a deformation caused by a push against the transparent protective plate into an electric signal and further operable to output the electric signal; and
  an optical touch panel disposed on the transparent protective plate operable to emit light beams for reticulately scanning an input operation area of the optical touch panel along orthogonal X and Y directions to detect a pointing input and a pointing input position in the input operation area when the light beams are intercepted by the pointing input, the input operation area having a display area that is visible through the transparent protective plate,
  wherein the pointing input device determines and outputs pointing position data indicating the pointing input position while the optical touch panel detects the pointing input, and
  the pointing input device outputs push detection data together with the pointing position data when the electric signal is outputted from the piezoelectric substrate and the push against the transparent protective plate is judged while the optical touch panel is detecting the pointing input,
  thereby indicating an activation of the pointing input device and preventing accidental activation of the device resulting from a momentary disruption in the light beams emitted by the optical touch panel.

2. A pointing input device comprising:
  a display panel operable to display any pointing input information on a display area;
  a transparent protective plate laminated on the display area of the display panel;
  a piezoelectric substrate attached to the transparent protective plate operable to convert a deformation caused by a push against the transparent protective plate into an electric signal and further operable to output the electric signal; and
  an optical touch panel disposed on the transparent protective plate operable to emit light beams for reticulately scanning an input operation area of the optical touch panel along orthogonal X and Y directions to detect a pointing input and a pointing input position in the input operation area when the light beams are intercepted by the pointing input, the input operation area having a display area that is visible through the transparent protective plate,
  wherein the pointing input device determines and outputs pointing position data indicating the pointing input position while the optical touch panel detects the pointing input, and
  the pointing input device outputs push detection data together with the pointing position data when the electric signal is outputted from the piezoelectric substrate and the push against the transparent protective plate is judged while the optical touch panel is detecting the pointing input, thereby indicating an activation of the pointing input device and preventing accidental activation of the device resulting from a momentary disruption in the light beams emitted by the optical touch panel, and
  wherein the piezoelectric substrate comprises a pair of piezoelectric substrates of narrow and elongated shape, and the piezoelectric substrates are attached to the transparent protective plate and are orthogonal to each other.

3. The pointing input device according to claim 1, wherein the push detection data and the pointing position data are together outputted only when the optical touch panel is detecting the pointing input and the piezoelectric substrate is detecting the push detection data.

4. The pointing input device of claim 1, further comprising:
  a controller operable to determine if the piezoelectric substrate has output the electric signal indicating a push against the transparent protective plate, to determine if the push against the transparent protective plate has occurred while the optical touch panel is detecting the pointing input, and to output push detection data together with the pointing position data only when the controller has determined that the electric signal is present during detection of the pointing input.

5. The pointing input device as set forth in claim 4, wherein the pointing input device outputs pointing position data detected by the optical touch panel when the controller determines that the electric signal outputted from the piezoelectric substrate is equal to or greater than a predetermined threshold voltage, the push against the transparent protective plate is greater than a predetermined pushing force, and the push against the transparent protective plate occurs while the optical touch panel is detecting the pointing input.

6. The pointing input device of claim 2, further comprising:
a controller operable to determine if the piezoelectric substrate has output the electric signal indicating a push against the transparent protective plate, to determine if the push against the transparent protective plate has occurred while the optical touch panel is detecting the pointing input, and to output push detection data together with the pointing position data only when the controller has determined that the electric signal is present during detection of the pointing input.

7. The pointing input device as set forth in claim 6, wherein the pointing input device outputs pointing position data detected by the optical touch panel when the controller determines that the electric signal outputted from the piezoelectric substrate is equal to or greater than a predetermined threshold voltage, the push against the transparent protective plate is greater than a predetermined pushing force, and the push against the transparent protective plate occurs while the optical touch panel is detecting the pointing input.

* * * * *